United States Patent
Pandozy

(10) Patent No.: US 7,478,871 B2
(45) Date of Patent: Jan. 20, 2009

(54) ANATOMICALLY SUPPORTIVE BICYCLE SEAT

(76) Inventor: Raffaele Martini Pandozy, 2312 Grand Ave., Apt. A, Dallas, TX (US) 75215

( * ) Notice: Subject to any disclaimer, the term of this patent is extended or adjusted under 35 U.S.C. 154(b) by 0 days.

(21) Appl. No.: 11/712,651

(22) Filed: Mar. 1, 2007

(65) Prior Publication Data
US 2007/0152481 A1 Jul. 5, 2007

Related U.S. Application Data

(63) Continuation-in-part of application No. 10/957,025, filed on Oct. 1, 2004, now abandoned.

(51) Int. Cl.
 B62J 1/00 (2006.01)
 B62J 1/18 (2006.01)
(52) U.S. Cl. .................. 297/202; 297/201; 297/214
(58) Field of Classification Search ............ 297/202, 297/201, 214
 See application file for complete search history.

(56) References Cited

U.S. PATENT DOCUMENTS

| | | | |
|---|---|---|---|
| 602,732 A | 4/1898 | Craig | |
| 620,881 A | 3/1899 | Blossom | |
| 628,704 A | 7/1899 | Gates | |
| 1,538,542 A | 5/1925 | Blake | |
| 1,858,477 A | 5/1932 | Blake | |
| 3,807,793 A | 4/1974 | Jacobs | |
| 4,218,090 A * | 8/1980 | Hoffacker et al. | 297/214 |
| 4,504,089 A | 3/1985 | Calvert et al. | |
| 4,898,422 A | 2/1990 | West, III | |
| 5,147,685 A | 9/1992 | Hanson | |
| 5,165,752 A * | 11/1992 | Terry | 297/214 |
| 5,720,518 A | 2/1998 | Harrison | |
| 6,019,425 A | 2/2000 | Yates | |
| 6,106,059 A | 8/2000 | Minkow et al. | |
| 6,139,098 A | 10/2000 | Carrillo | |
| 6,193,309 B1 | 2/2001 | Gootter et al. | |
| 6,224,151 B1 | 5/2001 | McMullen, Jr. | |
| 6,244,655 B1 | 6/2001 | Minkow et al. | |
| 6,322,139 B1 | 11/2001 | Chuang | |
| 6,450,572 B1 | 9/2002 | Kuipers | |
| 6,669,283 B2 | 12/2003 | Yu | |
| 6,739,656 B2 | 5/2004 | Yu | |
| 6,783,176 B2 | 8/2004 | Ladson, III | |
| 6,880,885 B2 | 4/2005 | Lan | |

(Continued)

FOREIGN PATENT DOCUMENTS

WO PCT/US91/09687 7/1992

(Continued)

*Primary Examiner*—Rodney B. White
(74) *Attorney, Agent, or Firm*—Schultz & Associates, P.C.

(57) ABSTRACT

An improved bicycle seat or exercise bicycle seat comprised of a narrow anterior portion leading to a wider posterior portion. The improved bicycle seat accommodates, supports, protects, and relieves the male genitals from the pressure of the rider's weight. The posterior portion includes two support surfaces divided by an indented channel. The support surfaces properly remove the weight of the rider from the soft tissues of the perineal area and distribute it to the ischial bones of the pelvis. Located between the narrow anterior portion and the wider posterior portion are two recessed concave cavities separated by a sloped raised ridge and a perineal support projection. The rider's external genitalia are properly supported and protected in the recessed cavities.

3 Claims, 3 Drawing Sheets

U.S. PATENT DOCUMENTS

| | | | |
|---|---|---|---|
| 7,025,417 B2 * | 4/2006 | Cohen | 297/202 X |
| 7,044,540 B2 * | 5/2006 | Bigolin | 297/202 X |
| 7,055,900 B2 * | 6/2006 | Losio et al. | 297/202 X |
| 7,059,674 B2 * | 6/2006 | Garland et al. | 297/202 X |
| 7,077,469 B2 * | 7/2006 | Badia i Farre | 297/202 |
| 7,083,229 B2 * | 8/2006 | Cope | 297/202 X |
| 7,121,622 B1 * | 10/2006 | Mendez | 297/201 |
| 7,273,250 B2 * | 9/2007 | Oehler | 297/202 X |
| 2002/0003364 A1 | 1/2002 | Minkow et al. | |
| 2003/0025364 A1 | 2/2003 | Antonio | |
| 2003/0034678 A1 | 2/2003 | Farre | |
| 2004/0113470 A1 | 6/2004 | Tobias | |
| 2005/0236875 A1 * | 10/2005 | Milton | 297/202 |
| 2006/0071516 A1 | 4/2006 | Pandozy | |

FOREIGN PATENT DOCUMENTS

| | | | | |
|---|---|---|---|---|
| WO | WO 9211175 A1 * | 7/1992 | | 297/202 |

* cited by examiner

ANATOMICALLY SUPPORTIVE BICYCLE SEAT

CROSS-REFERENCE TO RELATED APPLICATIONS

This application is a Continuation-In-Part claiming priority benefit from U.S. patent application Ser. No. 10/957,025 entitled "Male Bike or Exerciser Seat" filed on Oct. 1, 2004, now abandoned.

FIELD OF THE INVENTION

The present invention relates to a seat for a bicycle seat for male riders. In particular, the invention relates to a seat for a bicycle having an anatomically configured shape that supports and protects the male genitalia and the soft tissues of the perineum.

BACKGROUND OF THE INVENTION

The shape of the traditional bicycle seat has remained fairly consistent over time. The shape generally characterized by a wide posterior section connected to a narrow anterior section is functional but often causes rider discomfort and potential injury with prolonged periods of use. The discomfort and injury are usually the result of the seat not properly positioning the weight of a rider's upper body on the bones of the pelvis designed to support that weight.

In an ideal situation, when in the seated position, the weight of the human torso should rest primarily on the ischial tuberous bones. The typical prior art bicycle seat does not provide proper anatomical support for the ischial tuberous bones and therefore a bicycle rider's body weight is incorrectly shifted to the sensitive soft tissue areas of the perineum. The ischial tuberosities are the bones of the pelvis that support the weight of the body when in the sitting position. Furthermore, in the typical prior art bicycle seat, the weight of the male upper body rests on the soft tissues of and around the urethral duct and external genitalia instead of the ischial tuberous bones. Pressure from a rider's body weight on these areas can and does cause discomfort and injury. For example, unnatural pressure on the perineal area while straddling a bicycle seat can compress and temporarily occlude penile blood flow. The lining vessels of the compressed arteries can become damaged, thus leading to potential permanent artery blockage and erectile dysfunction. The pressure and the damage may also extend to the perineal membrane and the urogenital diaphragm, which can increase the risk of sexual disorders.

Another health risk is inflammation of the bulbourethral gland and the epidymis of the testicles. Damage to these areas can cause impotence and other more severe pathological complications. The narrow anterior section of the typical prior art bicycle seat used to control and stabilize the bicycle forces the testicles of the rider to either side of the anterior section where they can be squeezed between the bicycle seat and the thigh of the rider. This pressure not only can cause inflammation of the genitalia, but also impedes leg movement.

A wide variety of bicycle seats are known in the art. However, the prior art does not provide a bicycle seat with a correctly configured anatomical shape that can support and protect the external genitalia of the male body while concurrently positioning the pressure of the rider's upper body weight away from the perineal area.

International Application No. PCT/US91/09687 to Yates discloses a bicycle seat having a horn member with a generally horizontal upper surface and a rearwardly disposed laterally flaring cantle thrust plate member. Yates further discloses a highly elevated, forwardly projecting cantle thrust member conforming to the near vertical portion of the right and left posterior ischium. The pressure relief to the perineum afforded by this device is operable when aggressively pedaling and applying rearward pressure against the anatomically shaped cantle. The external genitalia of the male rider are forced to one side or the other of the horn member and typical body weight pressures will exist during times of coasting or non-pedaling.

U.S. Pat. No. 4,898,422 to West, III. discloses a bicycle seat having a narrow anterior portion which broadens to a wider posterior portion and further includes a central arrowhead shaped "cut-out". The "cut-out" provides relief for the rider's external genitalia but no relief for the perineum area is disclosed.

U.S. Pat. No. 6,193,309 to Gooter et al. discloses a bicycle seat for supporting the buttocks of a bicycle rider when the rider shifts his position on the seat between three specific positions. The disclosed seat is horseshoe shaped and includes a dual horn configuration with an elongated open space between intended to provide relief for the perineal area. The open area is not anatomically shaped, and does not provide adequate space for the male genitalia. The genitals of the male rider are unsupported and can be squeezed by the device's anterior portion by the weight of the rider.

SUMMARY OF INVENTION

The present invention addresses the need for an anatomically shaped bicycle seat, particularly one designed to accommodate, isolate, and protect the male genitals and the soft tissues of the perineal area.

The primary components of the bicycle seat include a semi-rigid shell attached to a tubular support frame that includes an attachment mechanism for mounting the seat to a seat post, a contoured padding laminate fitted over the shell, and a durable and flexible outer cover. Accordingly, an embodiment of the present invention provides an anatomically shaped bicycle seat that includes an oval shaped narrow anterior portion leading to a wider weight bearing posterior portion. The posterior portion includes a recessed and elongated indention that bisects the entire length of the posterior portion and continues downwardly around the posterior portion. The posterior portion also includes two generally convex support surfaces that properly support and distribute the weight of the rider to the ischial tuberous bones and simultaneously relieve pressure from the perineum directly adjacent the recessed elongated indention. Located between the posterior portion and the narrow anterior portion there are two concave cavities separated by a sloping projection. The two cavities and the sloping projection provide contoured pockets for acceptance of the rider's testicles. Generally central to the seat is a support projection for the perineal areas directly adjacent the sloping projection, the convex support surfaces and the elongated indention. The elevation of the narrow anterior portion is lower than that of the support surfaces and when combined with the two concave cavities provide an anatomically shaped recessed area to accommodate and protect the external genitalia of the rider.

Those skilled in the art will appreciate the above-mentioned features and advantages of the invention together with other important aspects thereof upon reading the detailed description that follows in conjunction with the drawings provided.

BRIEF DESCRIPTION OF THE DRAWINGS

In the detailed description of the preferred embodiments presented below, reference is made to the accompanying drawings.

DETAILED DESCRIPTION OF THE PREFERRED EMBODIMENT

Figure 1:
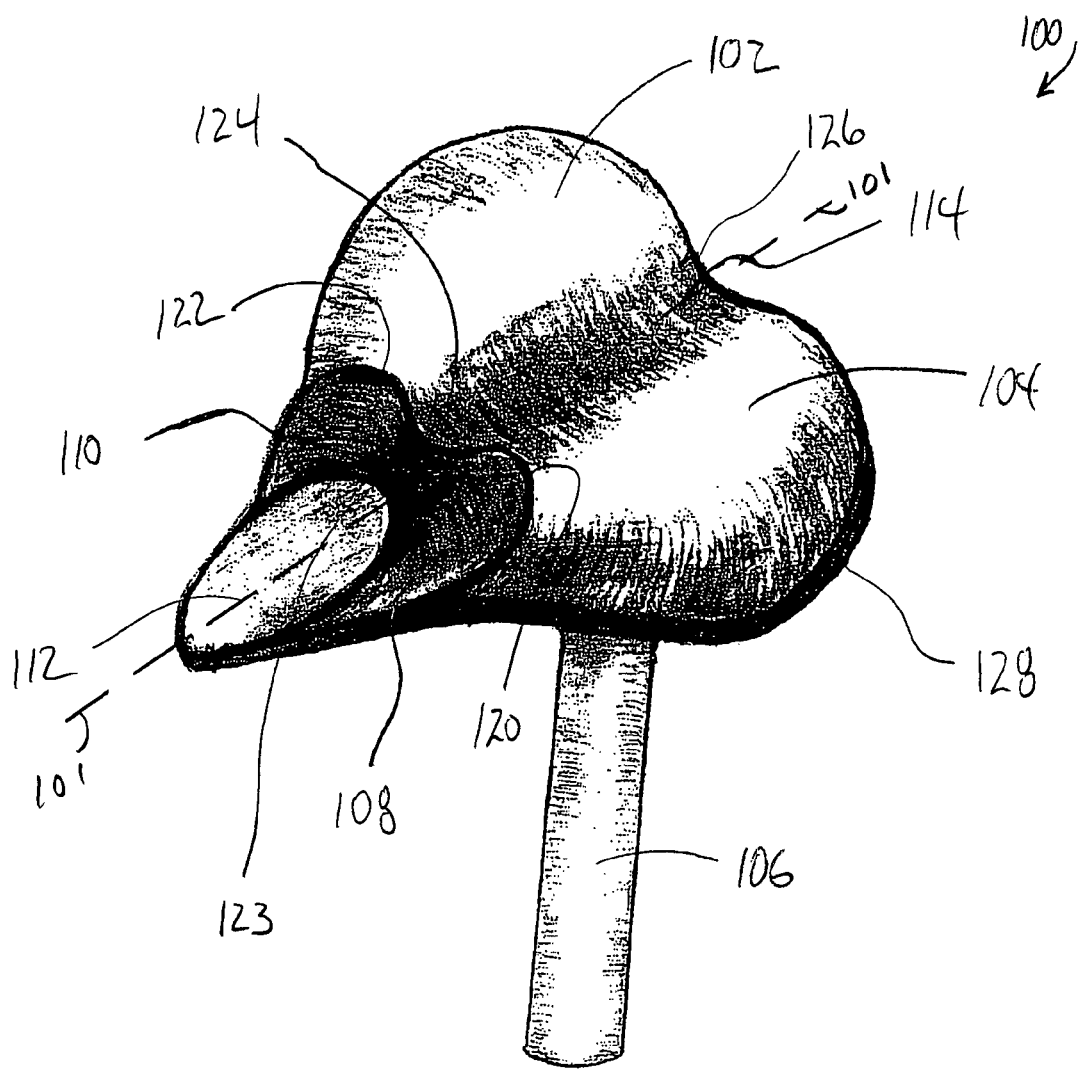
FIG. 1 is an isometric view of a preferred embodiment of the present invention.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

Figure 2:
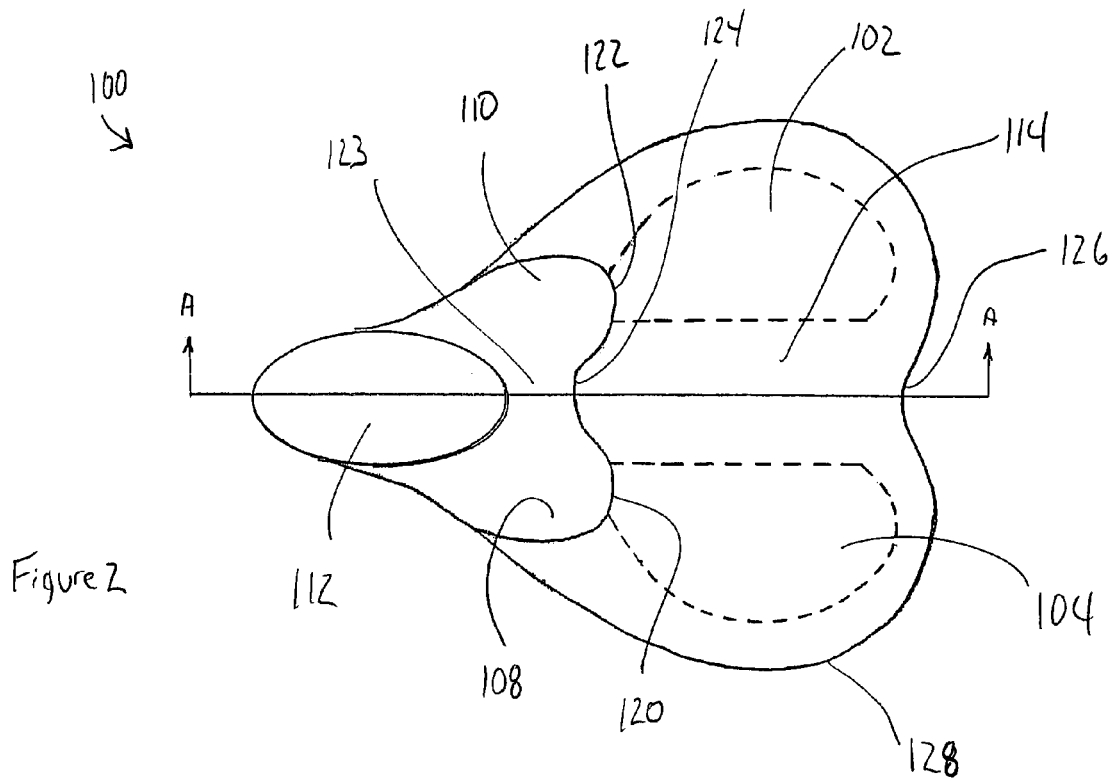
FIG. 2 is a plan view of a preferred embodiment of the present invention.
Figure 3:
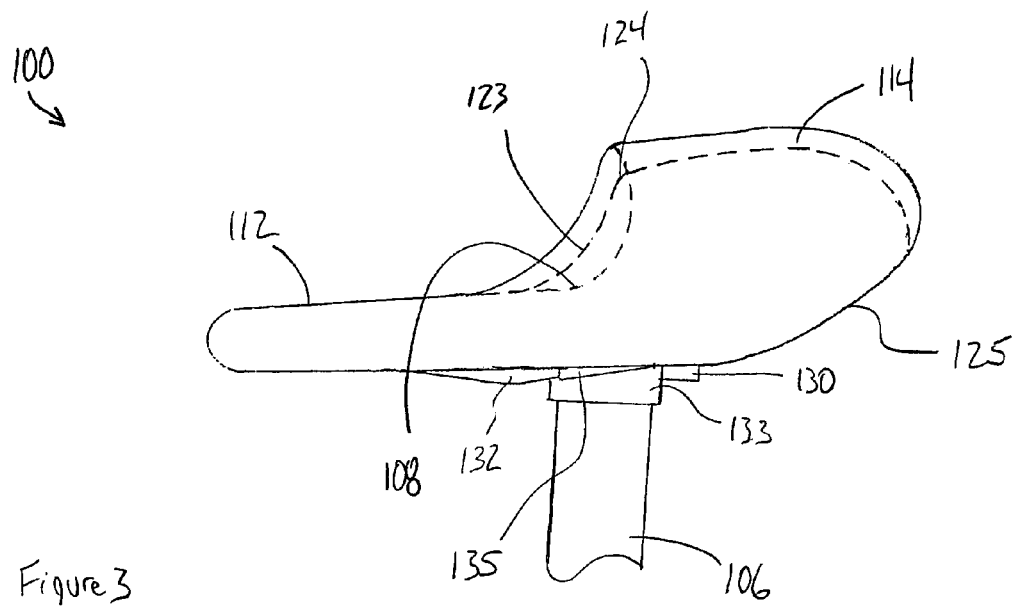
FIG. 3 is an elevation view of a preferred embodiment of the present invention.

Referring to FIGS. 1-3, bicycle seat 100 is generally horizontal in profile with a narrow anterior section shown as horn 112 leading to a wider posterior section 128. A longitudinal axis 101 can be appreciated from the anterior section to the posterior section. The bicycle seat is symmetrical about the longitudinal axis. Horn 112 is provided on the anterior section and has a generally oval flat upper surface. The horn has a symmetrical front and rear apex with an elliptical axis parallel to the longitudinal axis. Horn 112, in a preferred embodiment is approximately 1 inch thick. Posterior section 128 includes two raised weight bearing (shown as dashed areas) hemispherical supports 102 and 104. Hemispherical supports 102 and 104 are generally convex and hemispherical in shape and extend from channel 114 to the downwardly contoured lower portion of posterior section 128. Hemispherical supports 102 and 104 are adjacent to and in the preferred embodiment integrally formed with channel 114. The hemispherical supports are diametrically opposed to each other and reside on each side of the longitudinal axis of the bicycle seat. Hemispherical supports 102 and 104 are more pronounced than the top surface of horn 112 and in a preferred embodiment at their maximum height are approximately 3.5 to 4 inches thick from the corner edge of the seat. Projection 124 is centrally located on the surface of the seat. Projection 124 is located at the forward end of channel 114 and is adjacent cavities 108 and 110. Projection 124 is above the flat surface of horn 112 and yet below the lower surfaces of hemispherical supports 102 and 104. In the preferred embodiment, the maximum height of projection 124 is about 3 inches from the lower edge. Located on either side of projection 124 are cavities 108 and 110. Cavities 108 and 110 are concave recesses that adjoin ridge 120 and ridge 122 respectively and further connect to the top surface of horn 112 and ridge slope 123. The cavities are symmetrical about the longitudinal axis of the bicycle seat and are diametrically opposed. Posterior section 128 is bisected by channel 114 and indention 126. Channel 114 is a recessed groove or cavity that extends longitudinally from projection 124 to indention 126. Channel 114 separates hemispherical supports 102 and 104 as it extends from projection 124 to indention 126. Indention 126 forms a concave connection channel between hemispherical supports 102 and 104 and lower edge 125. In the preferred embodiment, the overall length of bicycle seat 100 is approximately twelve inches from the anterior tip of horn 112 to the back edge of posterior section 128 while the widest portion of posterior section 128 is approximately eight inches measured from the side of hemispherical support 102 to the opposite side of hemispherical support 104. Both measurements may be changed to accommodate different riders.

Figure 4:
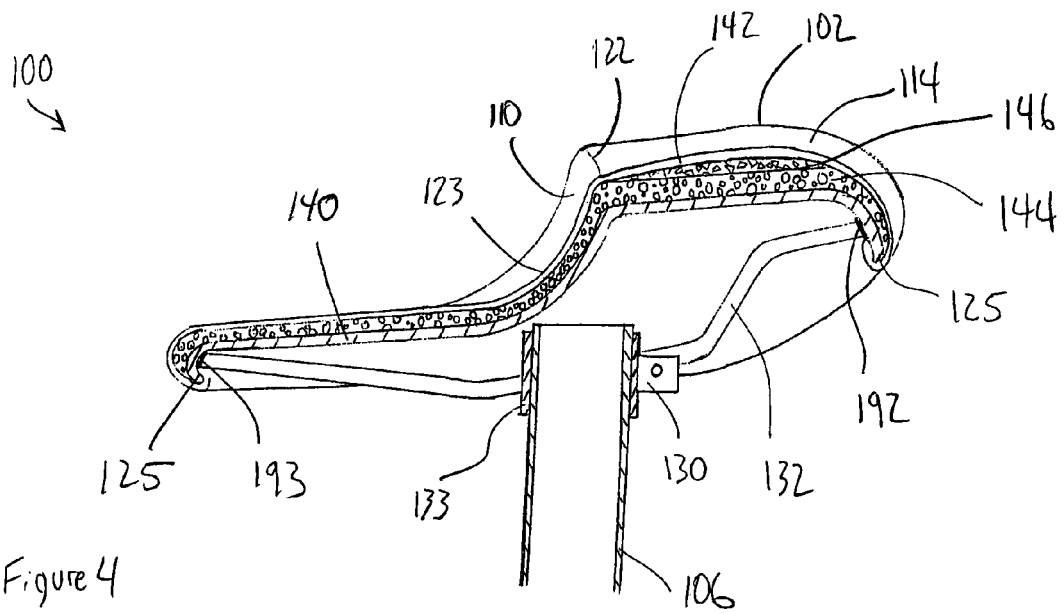
FIG. 4 is a plan view of a preferred embodiment of the present invention taken along line A-A of FIG. 2.
Figure 5:
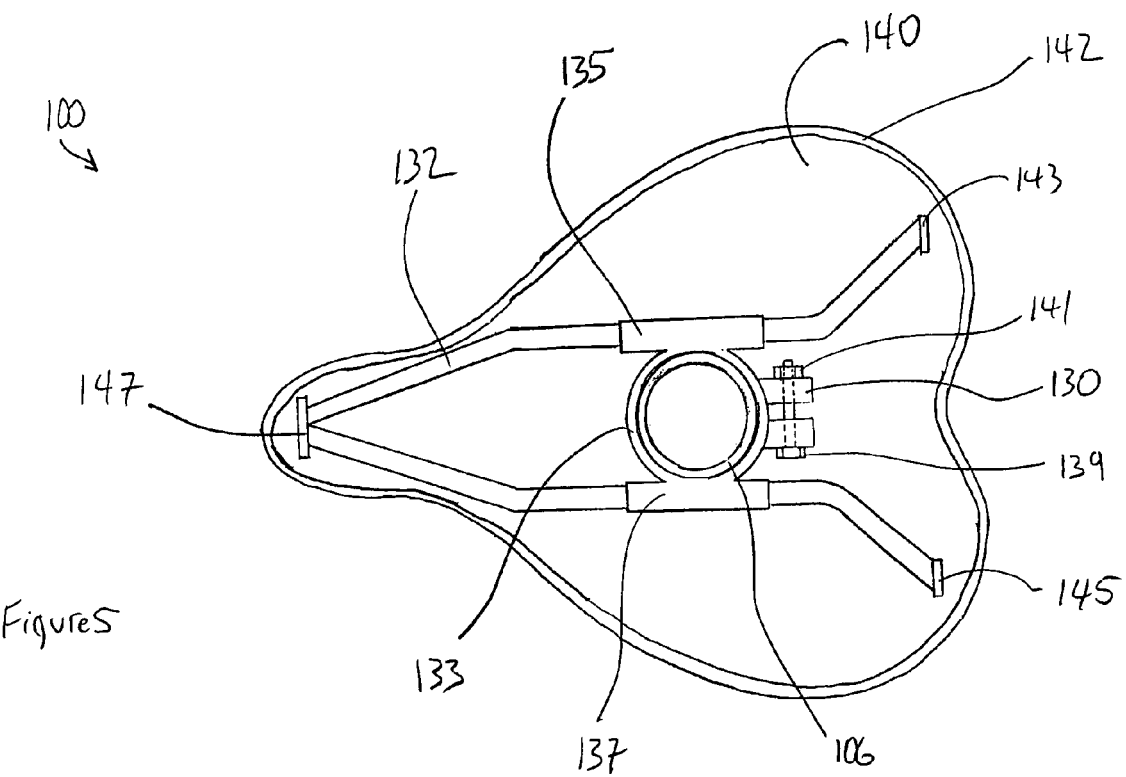
FIG. 5 is an underside plan view of a preferred embodiment of the present invention.

As shown in FIGS. 3-4, bicycle seat 100 also includes a mechanism to mount the seat on a bicycle post. Seat post 106 is inserted into seat clamp 130. Seat clamp 130 is connected to seat frame 132. Seat frame 132 is supported by bracket 133. Bracket 133 is comprised of frame supports 135 and 137 and seat clamp 130. In the preferred embodiment, the frame supports are tubular castings integrally formed with seat clamp 130. The tubular castings are cold pressed onto seat frame 132 to hold it in place. In one embodiment, knurled sections of the seat frame accommodate a rigid attachment to the frame support. Seat clamp 130 forms a collar around seat post 106 and is held in place by bolt 139 and nut 141. Nut 141 and bolt 139 create a compressive force in seat clamp 130 which in turn frictionally grasps the exterior of seat post 106.

Seat frame 132 has connections 143, 145 and 147. The connections are heat welded to the interior surface of seat shell 140 in the preferred embodiment, shown as weldements 192 and 193. Epoxy or a threaded attachment to the seat shell are also acceptable attachment methods. Seat frame 132 is constructed of 0.25 inch diameter stainless steel rod in the preferred embodiments. Seat post 106 is a hollow tube and is an industry standard size approximately 1 inch in diameter.

In the preferred embodiment, seat shell 140 is formed from a composite Kevlar fiber and epoxy resin. A stamped sheet metal construction may also be employed. Light metals such as aluminum and magnesium or alloys thereof are preferable to achieve low weight and durability. Seat shell 140 is formed in the correct anatomical shape and forms the base and the foundational shape of the bicycle seat. The general shape of seat shell 140 is generally the same as the finished shape of bicycle seat 100. Seat shell 140 is comprised of a narrow anterior portion widening to a posterior portion that includes a recessed longitudinal indention. Seat shell 140 also includes concave indentions located between the anterior portion and the posterior portion that when covered will form cavities 108 and 110.

FIG. 4 is a longitudinal cross-sectional view of bicycle seat 100 along section line A-A of FIG. 2. FIG. 4 shows seat frame 132 supporting seat shell 140. Padding 144 is affixed to seat shell 140. In the preferred embodiment, padding 144 is adhered to seat shell 140 with an adhesive, but screws or rivets can also be used. Padding 144 is covered by seat cover 142. The seat cover is coextensive with the padding. The seat cover further extends underneath and around lower edge 125 of the seat shell and is affixed to the inside of the lower edge with epoxy or rivets. In the preferred embodiment, seat cover 142 is constructed of a material such as vinyl or leather.

In the preferred embodiment, padding 144 is molded in one piece from polyurethane foam rubber and affixed to seat shell 140 and covered with seat cover 142. Other materials such as polyethylene closed cell foam or polystyrene foam may also be used for cushioning support. Generally, padding 144 is approximately 0.5 inch thick as it follows the contours of seat shell 140. The anatomic contours that make up the distinctive shapes of hemispherical supports 102 and 104, cavities 108 and 110, projection 124, and channel 114 are molded into the one-piece padding that is fitted over seat shell 140 in one embodiment. Padding 144 is thicker at hemispherical supports 102 and 104 as they bear the weight of the rider. The padding is also thicker along the ridge slope. In the preferred embodiment, padding 144 at hemispherical supports 102 and 104 and at ridge slope 123 is approximately 0.75 to one inch thick. In another embodiment, padding 144 is also thicker between cavities 108 and 110 and actually creates projection 124. In the preferred embodiment, padding 144 at projection 124 is approximately 0.75 to one inch thick.

In yet another embodiment, the padding can be a multi-layer laminate. In this embodiment, padding laminate 146 is a closed or open cell polyurethane foam of thickness ⅛" and of low crush strength resides directly at hemispherical supports 102 and 104 underneath seat cover 142 and adjacent padding 144 and fixed in place with an adhesive. In this embodiment, the crush strength of padding 144 is greater than that of padding laminate 146. The combination of the padding and the padding laminate more closely approximates the crush strength of the soft tissues of the rider and hence increases rider comfort.

In operation, seat post 106 is inserted onto a bicycle frame and attached to the seat using the seat clamp. Once mounted, the horizontal plane of bicycle seat 100 can be adjusted by bending frame supports 135 and 137 with respect to seat clamp 130 and tilting the seat to the desired position. The angle of the seat is a matter of preference, but typically a near horizontal position is desired. In use, bicycle seat 100 directs the weight of the rider to hemispherical supports 102 and 104. Properly supporting the weight of the rider relieves the pressure from the soft tissues of the male anatomy located in the perineal area commonly associated with typical bicycle seats. By creating a recessed channel in the weight bearing posterior section of bicycle seat 100, the rider's weight is properly allocated to the ischial tuberosities and forced to rest primarily on hemispherical supports 102 and 104. The indented, elongated characteristics of channel 114 located between hemispherical supports 102 and 104 create a space for and take undue pressure off of the soft tissues of the perineum of the rider.

Cavities 108 and 110 located at the anterior end of channel 114 create concave pockets to properly accommodate, isolate, and protect the male genitals. During use, cavities 108 and 110 isolate the testicles from the pressure of the rider's weight and support them above the sides of horn 112 to avoid interfering with leg movement. Ridge slope 123 serves to separate the testicles and provide further support. Projection 124 located between cavities 108 and 110 provides more padded protection for the testicles and also provides an orientation point for the rider. The padding thickness is increased between cavities 108 and 110 to create projection 124. Projection 124 is designed to anatomically meet the inferior linguinal joint of the urethral duct and the testes of the rider. The rider can feel projection 124, which provides assurance that he is properly situated on bicycle seat 100. When the rider is correctly situated on the seat, the rider's body weight is properly distributed on hemispherical supports 102 and 104. Further, the raised and supported position of the testicles above horn 112 allow the rider to fully use horn 112 for control and stabilization of the bicycle without squeezing the testicles against the sides of horn 112. With the weight of the rider properly supported, the pressure against the above mentioned body parts is eliminated and a rider is less likely to damage those body parts.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A bicycle seat surface, having a seat front, a seat rear and a longitudinal axis between the seat front and the seat rear, for a bicycle comprising:
   an oval anterior projection having a first apex directed toward the seat front and a second apex directed toward the seat rear;
   the oval anterior projection having an axis between the first apex and the second apex generally parallel to the longitudinal axis of the bicycle seat;
   a first concave testicle support cavity connected to the second apex;
   a second concave testicle support cavity connected to the second apex;
   the first concave testicle support cavity and the second concave testicle support cavity being diametrically opposed and adjacent opposite sides of the longitudinal axis of the bicycle seat;
   a raised ridge slope adjacent to and integral with the first concave testicle support cavity and the second concave testicle support cavity;
   a first convex hemispherical posterior support section adjacent the first concave testicle support cavity;
   a second convex hemispherical posterior support section adjacent the second concave testicle support cavity;
   the first convex hemispherical posterior support section and the second convex hemispherical posterior support section being diametrically opposed and adjacent opposite sides of the longitudinal axis of the bicycle seat;
   a concave longitudinal channel adjacent to and integral with the first hemispherical posterior support section and the second hemispherical posterior support section and parallel to the longitudinal axis of he bicycle seat; and
   a convex perineal support projection centrally disposed between and adjacent to the first testicle support cavity, the second testicle support cavity, the first hemispherical posterior support section, the second hemispherical posterior support section and integrally formed with the concave longitudinal channel.

2. The bicycle seat surface of claim 1 wherein:
   the first convex hemispherical posterior support section and the second convex hemispherical posterior support section each have a first crush strength;
   the perineal support projection has a second crush strength; and,
   the first crush strength is less than the second crush strength.

3. The bicycle seat surface of claim 1 wherein the oval anterior projection has a substantially flat exterior surface.

* * * * *